Figure 1:
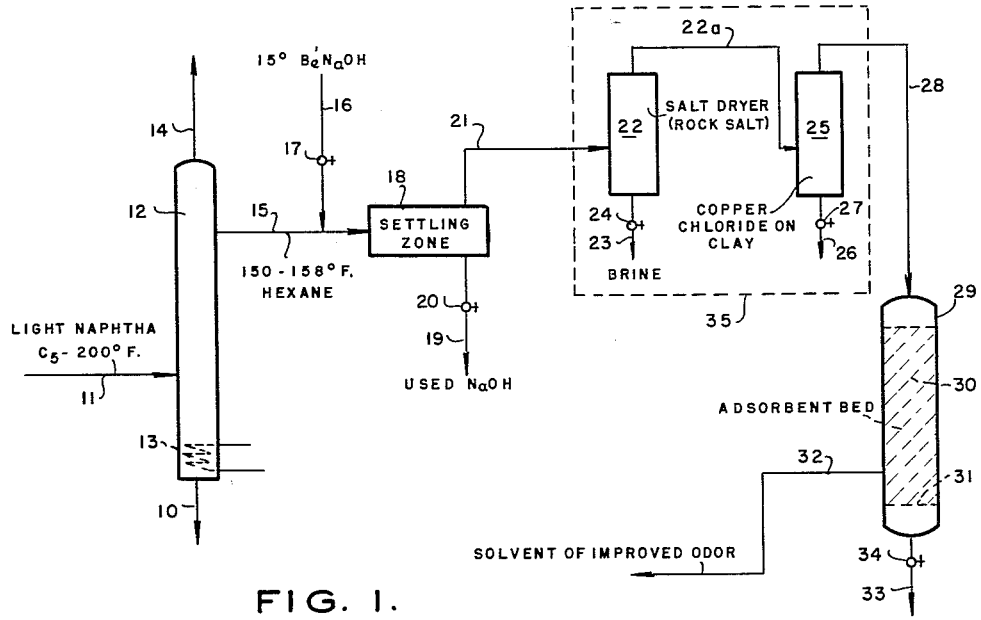

INVENTORS.
WILLIAM K. ROBBINS,
BY ORAL C. BEHYMER,

ATTORNEY

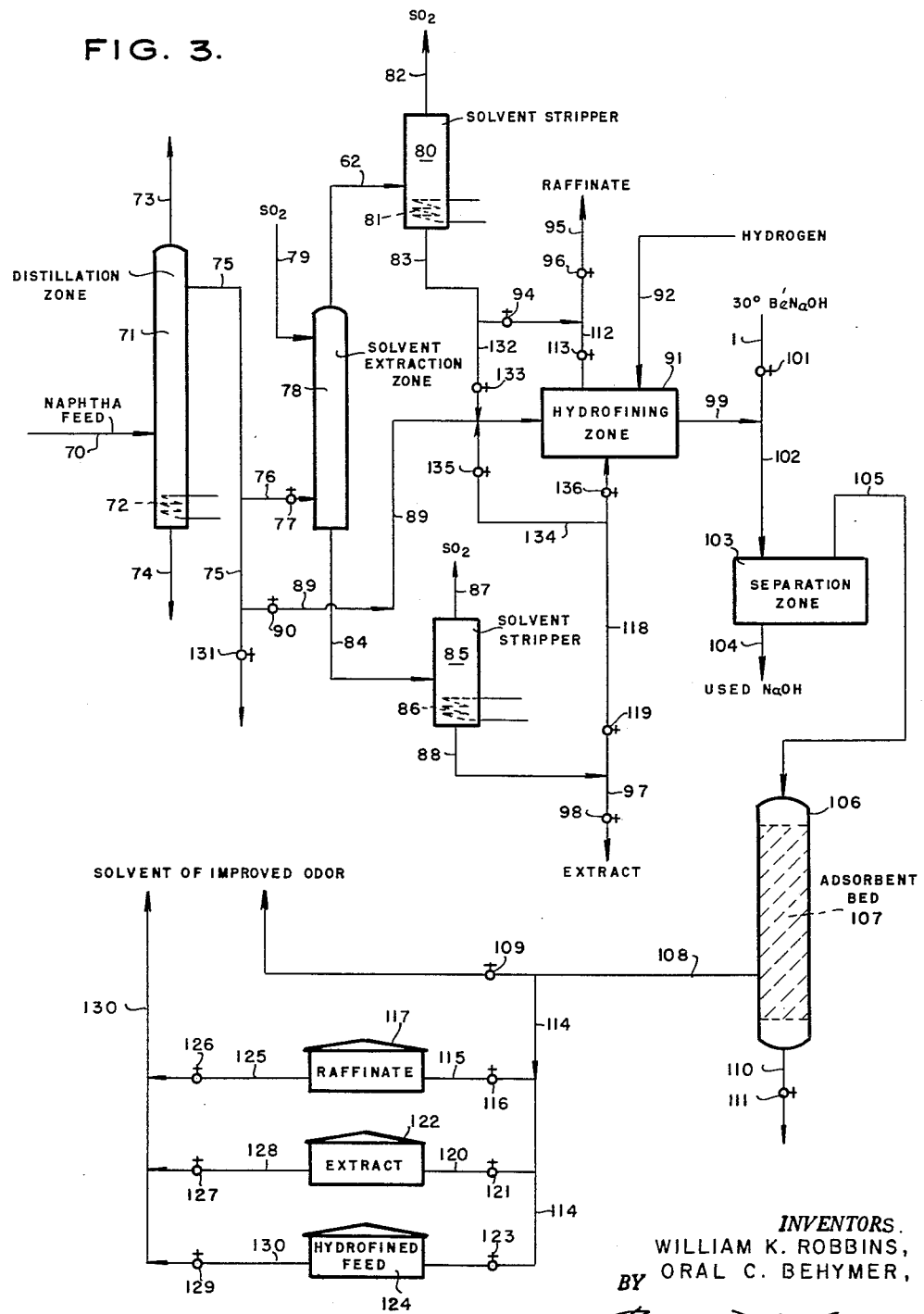

United States Patent Office 3,039,957
Patented June 19, 1962

3,039,957
PRODUCTION OF SOLVENTS
William K. Robbins and Oral C. Behymer, Baytown, Tex., assignors, by mesne assignments, to Esso Research and Engineering Company, Elizabeth, N.J., a corporation of Delaware
Filed Feb. 9, 1960, Ser. No. 7,637
10 Claims. (Cl. 208—212)

The present invention is directed to a method for producing solvents. More specifically, the invention is concerned with producing solvents of improved odor. In its more specific aspects, the invention is directed to a method of producing improved odor hydrocarbon solvents.

This application is a continuation-in-part of Serial No. 739,372, filed June 2, 1958, now abandoned, for William K. Robbins and Oral C. Behymer and entitled "Production of Aliphatic Solvents."

The present invention may be briefly described as a method for producing solvents of improved odor. In the present invention a hydrocarbon fraction boiling in the range from about 100° to about 550° F. is contacted with an aqueous solution of alkali metal hydroxide having a Beaumé gravity within the range from about 15° to about 50°. The solution is separated from the fraction and the separated fraction is then contacted with an adsorbent which serves to remove phenolic and other odor-forming or odoriferous bodies from the separated fraction. The odor-forming or odoriferous compounds are usually present in trace quantities. For example, concentrations as low as 0.1 p.p.m. of compounds such as hydrogen sulfide, mercaptans, disulfides, phenols, nitrogen compounds, and the like may be objectionable.

The adsorbent may suitably be bauxite, activated magnesium oxide, activated charcoal, and mixtures of activated magnesium oxide and activated charcoal. A solvent of improved odor is separated from the adsorbent. While the adsorbent may be any one of the several adsorbents mentioned, it is preferred to employ activated charcoal. Activated magnesium oxide in admixture with activated charcoal may also be used. However, quite satisfactory results are obtained with activated magnesium oxide alone. Likewise, solvents of satisfactory odor may be produced with bauxite. It is also intended that, besides using bauxite, it may be possible to use the aluminas, which are also suitable adsorbents.

While the odor-forming or odoriferous bodies or compounds, including the sulfur compounds, are usually present in the fraction contacted with the adsorbent in trace quantities, they may be present in concentrations up to 10 p.p.m. but usually will be present in concentrations less than 5 p.p.m. The odoriferous compounds are primarily oxygenated compounds and usually are of phenolic type or nitrogen compounds and it is essential that the content of these compounds in the product be substantially removed. On the other hand, the heavier fractions may tolerate a relatively high concentration of sulfur since it has been found that valuable odorless products may be produced which boil in the range from about 400° F. to about 550° F. which, after contacting with adsorbent such as activated charcoal, may contain from about 3 to about 10 p.p.m. of sulfur. If the sulfur content of the product treated in accordance with the present invention exceeds 10 p.p.m. of sulfur, the odor of such product is apt to be unsatisfactory.

It is to be emphasized that the sulfur compounds under consideration are the odoriferous sulfur compounds and do not include free sulfur which, insofar as the present invention is concerned, is odorless. Thus, the product may have a substantial content of free sulfur and odorless sulfur compounds but will be substantially free of the odoriferous sulfur compounds.

The feedstock employed in the present invention is a crude petroleum naphtha boiling in the range up to about 650° F. which is fractionally distilled to produce fractions boiling from about 100° to about 550° F. Such fractions may be aliphatic or aromatic in nature and may be obtained by distillation of selected crude petroleums.

The product produced from the feedstock may be of predominantly saturated hydrocarbons such as paraffins and/or naphthenes or may be predominantly aromatic hydrocarbons or may be a product of adjusted aromaticity. To obtain a product which is predominantly aromatic hydrocarbons or which is predominantly saturated hydrocarbons, the fraction boiling in the range from about 100° to about 550° F. may be suitably extracted with a solvent such as sulfur dioxide to obtain a raffinate which is predominantly saturated and an extract which is predominantly aromatic which may be treated in accordance with the present invention and then may be employed separately or may be combined to adjust the aromatic hydrocarbon content. A portion of the feed fraction may also be treated separately in accordance with the present invention or combined in any proportion with either the raffinate or extract or both of them to produce a product of adjusted aromaticity.

Other solvents than sulfur dioxide may be used although sulfur dioxide is preferred. These other solvents may be furfural, phenol, nitrobenzene, and any of the many well-known solvents which are employed to separate saturated hydrocarbons from aromatic hydrocarbons.

The aliphatic saturated hydrocarbon may suitably boil in the range from about 100° up to about 550° F. Illustrative of the aliphatic saturated hydrocarbon solvents which are produced in the present invention are hexane, heptane, octane, solvents boiling in the range from about 135° to about 250° F., solvents boiling in the range from 250° to 290° F., and the aliphatic solvents known to the trade as Varsol No. 1 and Varsol No. 2.

The contact of the treated hydrocarbon fraction with the alkali metal hydroxide solution and with the adsorbent may suitably be conducted at ambient temperatures. For example, temperatures in the range from about 60° to about 100° F. are satisfactory. Preferably, temperatures in the range from about 80° to about 100° F. may be used.

The alkali metal hydroxide solution is preferably sodium hydroxide solution, although solutions of potassium hydroxide and lithium hydroxide may also be used.

In employing the alkali metal hydroxide solutions, it is preferred to employ the solution on a once through basis. That is, the hydrocarbon feed is always contacted with a fresh alkali metal hydroxide solution. Under some circumstances, however, it may be possible to recirculate the alkali metal hydroxide solution, although it is preferred to contact the fraction always with fresh solution for best results.

Contacting of the hydrocarbon feed with fresh solution of alkali metal hydroxide is important since this eliminates any possibility of the hydrocarbon feed absorbing or dissolving odor-forming or odoriferous compounds from the alkali metal hydroxide solution.

While it may be preferred to contact the caustic treated fraction with the adsorbent arranged as a bed, it is to be understood that the contact may be made forming a slurry of the adsorbent in the caustic treated fraction. Employing a bed simplifies the separation problem and ordinarily will be preferred.

Figure 2:
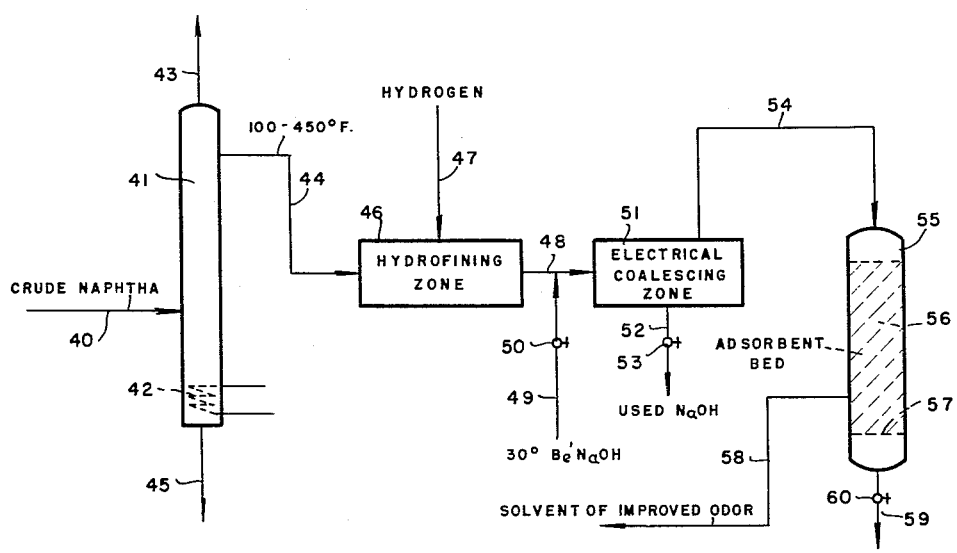

The present invention will be further illustrated by reference to the drawing in which:

FIG. 1 illustrates one mode of practicing the invention;
FIG. 2 illustrates a preferred mode; and
FIG. 3 illustrates a modification of FIG. 2.

Referring now to the drawing, numeral 11 designates a charge line by way of which a light naphtha fraction, such as one boiling in the range from about pentane up to about 200° F. is introduced into a fractional distillation zone 12 which may be a plurality of distillation towers but which, for purposes of this description, is shown as a single distillation tower. Zone 12 is provided with a suitable heating means illustrated by steam coil 13 for adjustment of temperature and pressure and with line 14 for removal of light fractions, line 15 for separation of a hexane fraction, and line 10 for discard of heavier fractions.

It is to be understood that zone 12 is provided with suitable internal contacting means to insure intimate contact between vapors and liquids and is also provided with auxiliary cooling means and means for inducing reflux, not shown. Stated briefly, zone 12 is provided with all means usually found in a modern distillation tower.

The hexane fraction in line 15 is contacted with an aqueous solution of sodium hydroxide having a Beaumé gravity of about 15°, which is introduced from a source, not shown, by way of line 16, controlled by valve 17. Line 15 may be provided with a suitable incorporator or other mixing means, not shown, to insure mixing between the hexane and the caustic solution. The mixture is then discharged into a settling zone 18, which is of the gravity type and is of sufficient size to provide a residence time for separation between the caustic-treated fraction and the used caustic, the used caustic being separated by line 19, controlled by valve 20, and discharged from the system.

The separated treated fraction is withdrawn from zone 18 by line 21 and is introduced thereby into a salt drier 22, which may be a vertical vessel containing rock salt, the purpose of drier 22 being to remove moisture from the treated fraction. Line 23, controlled by valve 24, is provided in zone 22 for discard of any brine, while the substantially dried fraction is withdrawn by line 22a and introduced into the bottom of a vertical vessel 25, which may contain solid copper chloride dispersed on clay. The copper chloride sweetens the hexane fraction and prepares it for further treatment as will be described. Any moisture which is not removed in drier 22 may be discharged from vessel 25 by line 26, controlled by valve 27.

The treated fraction is then withdrawn from vessel 25 by line 28 and introduced into zone 29, which contains a bed of adsorbent 30 arranged on a grid plate 31. Preferably, the adsorbent is a mixture of activated charcoal and activated magnesium oxide. On passage through the bed 30 at a flow rate in the range from about 1.0 to about 6 volumes of treated fraction per volume of adsorbent per hour, the treated fraction may be withdrawn by line 32 as a solvent of improved odor and then used therefor. Any moisture which may accumulate in zone 29 may be withdrawn by line 33, controlled by valve 34.

In the practice of the present invention, it is contemplated that the salt drier 22 and the copper chloride vessel 25 may be considered as a treating step 35, shown enclosed by the dotted lines and which suitably may include a treating operating wherein the fraction in line 21 is subjected to treatment with an alkali metal hypochlorite solution or an alkaline earth metal hypochlorite solution. As examples of hypochlorite treating operations, reference may be had to the Earhart Patent 2,721,166.

It will be seen from the foregoing description taken with respect to FIG. 1 that a simple and practical method has been provided for obtaining solvents of improved odor.

Referring now to FIG. 2 in which a preferred mode will be described, a crude petroleum naphtha is introduced into the system by way of line 40 into a fractional distillation zone 41, which may be similar to fractional distillation zone 12 of FIG. 1. Zone 41 is provided with a heating means 42 and with line 43 for removal of light fractions. In line 44, a fraction is separated which suitably may boil in the range from about 100° to about 450° F. Heavier fractions may be discarded by line 45. It may be desirable to obtain a plurality of fractions from zone 41 and treat each fraction individually in accordance with the present invention. The fraction in line 44 is introduced thereby into a hydrofining zone, generally indicated by the numeral 46, into which hydrogen is led by way of line 47. Hydrofining zone 46 may operate at a temperature in the range from about 550° to about 650° F., at a pressure in the range from about 150 to about 500 at a pressure in the range from about 150 to about 500 pounds per square inch gauge, and at a space velocity in the range from about 2 to about 10 v.v./hr.

A sulfur-insensitive catalyst is employed in hydrofining zone 46 and may be any of the several well-known catalysts of this type but which may be illustrated by cobalt molybdate, molybdenum sulfide, molybdenum oxide, and the like. Ordinarily, cobalt molybdate on a suitable support, such as alumina, is to be preferred with about 5 to 10 percent by weight of cobalt molybdate on the support, although greater or lesser amounts may be used.

By contacting the fraction with the sulfur-insensitive catalyst under conditions given, in the presence of hydrogen, the fraction is substantially reduced of its sulfur content and is then withdrawn by way of line 48 into which there is introduced by way of line 49, controlled by valve 50, a solution of alkali metal hydroxide, such as 30° Beaumé sodium hydroxide. Like line 15 in FIG. 1, line 48 may be provided with a suitable mixing device, such as an incorporator, to insure a thorough mixing of the sodium hydroxide solution with the fraction in line 48. The mixture is then discharged from line 48 into an electrical coalescing zone 51 provided with an electrical precipitator which separates the used caustic from the treated fraction. The used sodium hydroxide is discharged by line 52, controlled by valve 53. The treated fraction is then withdrawn from zone 51 by line 54 and introduced into an adsorbent zone 55, which is similar to zone 29 of FIG. 1, containing a bed 56 of suitable adsorbent arranged on a grid plate 57. Solvent of improved odor is removed from bed 56 by way of line 58, discharging from above the grid 57, while any moisture accumulating in the bottom of zone 55 may be withdrawn by line 59, controlled by valve 60.

It will be clear from the description taken with FIG. 2 that the preferred mode is simpler to operate than FIG. 1 and allows the production of solvents of improved odor using readily available equipment.

Referring now to FIG. 3, which is a further modification of the preferred mode, numeral 70 designates a charge line by way of which a crude naphtha which may boil in the range up to about 650° F. is charged into distillation zone 71. Distillation zone 71 is a modern distillation tower or a plurality of modern distillation towers provided with suitable internal vapor-liquid contacting means such as bell cap trays and the like, means for inducing reflux, condensing and cooling means and other auxiliary equipment usually associated with such distillation facilities. Zone 71 is provided with a heating means illustrated by steam coil 72, line 73 for removal of an overhead fraction, line 74 for withdrawal of heavier fractions and line 75 for removal of a fraction boiling in the range from about 100° to about 550° F. The fraction in line 75 is preferably charged by line 76 controlled by valve 77 into a solvent extraction zone 78 which also may be provided with internal liquid-liquid contacting means. Solvent such as liquefied sulfur dioxide is introduced into zone 78 by line 79 and contacts counter currently the fraction introduced by line 76. Conditions are adjusted in zone 78 to provide a raffinate phase and an extract phase. These conditions may include a temperature in the range from about 0° to about —60° F. and a solvent-to-hydrocarbon ratio in the range from about 0.5:1 to 3.0:1. Good results may be obtained at a temperature of about —40° F. and a solvent-to-hydrocarbon ratio of about 1:1. Under these conditions raffinate and extract phases are formed and the raffinate phase is withdrawn by line 62 into a solvent stripper 80 provided with a heating means illustrated by a steam coil 81 for adjustment of temperature and pressure in stripper 80. Sulfur dioxide is removed from stripper 80 by line 82 and the stripped raffinate is withdrawn therefrom by line 83 for further handling as will be described. The solvent extract is withdrawn from zone 78 by line 84 and introduced thereby into a solvent stripper 85 which is similar to stripper 80 and is provided with a heating means illustrated by steam coil 86. By adjustment of temperatures and pressures in stripper 85, sulfur dioxide is removed by line 87 for admixing with the sulfur dioxide removed by line 82 and for reuse in the operation by charging to line 79. The stripped extract is removed from stripper 85 by line 88 for further treatment as will be described.

In some instances, it may be desirable partially to bypass solvent extract zone 78, and to this end line 89 controlled by valve 90 is provided which allows the extraction zone 78 to be by-passed and a portion of the fraction boiling in the range from about 100° to about 550° F. to be introduced directly into a hydrofining zone 91, into which hydrogen is charged by line 92. When this occurs, the solvent raffinate in line 83 will be discharged by line 93 controlled by valve 94 into line 95 controlled by valve 96 and sent to storage to be accumulated for further treatment as will be described. Likewise, when extraction zone 78 is by-passed by the feed, the solvent extract in line 88 is discharged into line 97 controlled by valve 98 for discharge into storage for further treatment, as will be described. In hydrofining zone 91 the fraction charged by line 89 is subjected to hydrofining conditions to substantially remove the odoriferous compounds, which will include those sulfur compounds which are odoriferous. As a result, the hydrofined fraction discharged by line 99 may contain trace quantities of odoriferous compounds and up to 10 p.p.m. of odoriferous sulfur compounds. This fraction is admixed with a solution of fresh sodium hydroxide such as one having a Beaumé gravity of 30° introduced by line 1 controlled by valve 101. The mixture of the hydrofined fraction and the sodium hydroxide solution then flows by line 102 into a separation zone 103 which may be any type of separation zone for making a separation between the hydrofined fraction and the sodium hydroxide solution. The sodium hydroxide solution is discharged by line 104. The hydrofined and sodium hydroxide treated fraction is withdrawn from zone 103 by line 105 and introduced into a contacting zone 106 which suitably may contain a bed 107 of an adsorbent such as of the type mentioned before but which is preferably activated charcoal. As a result of this contacting operation, there is withdrawn by line 108 a solvent of improved odor which may be withdrawn by opening valve 109 to storage as may be desired. Any moisture may be withdrawn from zone 106 through line 110 controlled by valve 111.

When the solvent raffinate is charged by way of line 112 controlled by valve 113 to hydrofining zone 91, the solvent raffinate is treated in the sequence such as has been described before and is discharged from line 103 into line 114 and thence by branch line 115 controlled by valve 116 into treated raffinate storage 117. Likewise, the solvent extract, when it is charged to hydrofining zone 91, may be introduced thereto through line 118 controlled by valve 119 and the hydrofined extract then treated with sodium hydroxide solution and adsorbent as has been described. The solvent extract is routed through line 114 and thence by line 120 controlled by valve 121 into extract storage 122.

When the feed hydrocarbon is separately treated, it may be routed by line 108 and line 114 and thence by opening valve 123 into hydrofined feed storage 124. Thereafter the hydrofined raffinate, hydrofined extract, and hydrofined feed may be blended as desired by opening valve 125 in line 126, valve 127 in line 128, and valve 129 in line 130, allowing the raffinate, extract and feed after hydrofining and treating in accordance with the present invention to be blended in any proportion to adjust the aromaticity of the solvent of improved odor. Thus, in accordance with the present invention, a saturated hydrocarbon solvent may be recovered, an aromatic hydrocarbon solvent may be recovered, or one of varying or adjustable aromaticity may be recovered as desired.

As shown in the drawing, provision is made in line 75 for accumulating the feed in line 75 in a separate storage tank (not shown), for subsequent running through the system, on opening valve 131. It will be noted that provision is made to connect line 83 by branch line 132 controlled by valve 133 such that a portion of the raffinate may be introduced back with a portion of the feed in line 89. Likewise, provision is made by branch line 134 controlled by valve 135 for introduction of a portion of the extract in line 89. Under these latter circumstances, valve 136 would be closed, depending on the proportions employed.

In the practice of the present invention, it will be understood that both the solvent raffinate and solvent extract will be subjected to water and caustic washing to remove traces of sulfur dioxide before the solvent raffinate and solvent extract are subjected to the hydrofining operation. It will also be understood that the hydrofining zone will include facilities for stripping the hydrofined product with steam to remove any hydrogen sulfide which may be formed in that operation. Steam stripping facilities are ordinarily and usually provided in modern hydrofining operations.

The invention will be further illustrated by reference to the following examples: A heptane fraction was treated with a caustic solution and then hypochlorite-sweetened, following which it was contacted with activated carbon. On separation of the activated carbon, the heptane was found to be of acceptable odor. In another operation, a heptane fraction was treated in accordance with the mode of FIG. 1 using the salt drier and copper chloride on clay, followed by contact with activated charcoal. The product was a solvent of improved odor.

A fraction boiling in the range from about 300° to about 400° F. was contacted with a sodium hydroxide solution of 30° Beaumé and then treated with activated charcoal to produce a solvent having acceptable odor.

The same fraction was also contacted with a 30° Beaumé sodium hydroxide solution, following which it was contacted with powdered magnesium oxide in activated condition. Again, a solvent of improved odor was obtained, in fact, superior to the one contacted with activated carbon. In another operation, the fraction boiling in the range from about 300° to 400° F. was treated with sodium hydroxide as an aqueous solution of 30° Beaumé and then contacted with activated alumina (bauxite) to obtain a solvent having satisfactory odor characteristics but slightly inferior to the activated carbon-treated solvent.

In another run, the fraction boiling in the range between 300° and 400° F. was treated with 30° Beaumé sodium hydroxide solution and then contacted with a mixture of powdered magnesium oxide in an activated condition and charcoal in an activated condition. This operation produced a solvent of improved odor superior to the other treatments.

A run was made in which a mixed distillate from Gulf Coastal crudes was distilled to recover a fraction which was subjected to hydrofining conditions to form a hydrofined product. The hydrofined product was washed with sodium hydroxide solution and then percolated through a bed of activated charcoal. The following Table I sets out the inspection characteristics of the feed fraction, the fraction of the distillate from the feed fraction which was fed to the hydrofiner and the product from the hydrofiner.

Table I

| Fraction | Feed | Hydrofiner feed | Hydrofiner product |
|---|---|---|---|
| Gravity, °API | 23.2 | 21.6 | 20.9 |
| I.B.P., °F | 360 | 414 | 426 |
| F.B.P., °F | 526 | 497 | 513 |
| 5% distilled at, °F | 379 | 420 | 433 |
| 10% distilled at, °F | 389 | 424 | 437 |
| 20% distilled at, °F | 402 | 430 | 440 |
| 30% distilled at, °F | 413 | 433 | 444 |
| 40% distilled at, °F | 424 | 436 | 447 |
| 50% distilled at, °F | 433 | 440 | 450 |
| 60% distilled at, °F | 443 | 446 | 455 |
| 70% distilled at, °F | 456 | 453 | 460 |
| 80% distilled at, °F | 469 | 462 | 468 |
| 90% distilled at, °F | 487 | 475 | 479 |
| 95 distilled at, °F | 503 | 484 | 490 |
| Flash, PM, +F | 158 | 190 | 202 |
| Color | [1] 17 | [1] 2 | [2] +16 |
| Aniline point, °C. (mixed) | 27.2 | 27.1 | 25.6 |
| Bromine number | 1.6 | 1.9 | 0.6 |
| Kauri-butanol number | 89.9 | 90.0 | 91.7 |
| Refractive index, 20°C | 1.5246 | 1.5304 | 1.5320 |
| Analysis: | | | |
| Aromatics | 84.2 | 85.4 | 85.7 |
| Olefins | 0.4 | 0.5 | 0.3 |
| Paraffins | 6.7 | 5.2 | 5.1 |
| Naphthenes | 8.7 | 8.8 | 8.9 |

[1] Rob.  [2] Say.

It will be clear from the inspection characteristics that the product treated in accordance with the present invention is of substantially improved quality over the feed to the hydrofining operation. This product was of good odor and highly aromatic, containing nearly 86% aromatics and had a high kauri-butanol number, which is indicative of high solvency. It is to be noted further that the product had a low bromine number, which reflects the small amount of olefins shown by the analysis. This product has been used successfully as an insecticide base.

In another operation in accordance with the present invention, a Varsol distillate was subjected to treatment which included hydrofining, caustic washing, and activated charcoal filtration. The Varsol distillate was also extracted with sulfur dioxide to form a sulfur dioxide extract. The products were recovered and the inspection characteristics and the analyses thereof are shown in Table II.

Table II

| Fraction | Varsol distillate | | Varsol SO₂ extract | |
|---|---|---|---|---|
| | Feed | Product | Feed | Product |
| Gravity, °API | 48.0 | 48.0 | 32.0 | 32.1 |
| I.B.P., °F | 319 | 320 | 316 | 317 |
| F.B.P., °F | 392 | 390 | 402 | 404 |
| Dry point, °F | 376 | 385 | 400 | 399 |
| 5% distilled at, °F | 324 | 325 | 320 | 321 |
| 10% distilled at, °F | 325 | 327 | 323 | 323 |
| 20% distilled at, °F | 329 | 330 | 326 | 326 |
| 30% distilled at, °F | 331 | 332 | 329 | 329 |
| 40% distilled at, °F | 334 | 335 | 332 | 332 |
| 50% distilled at, °F | 337 | 338 | 336 | 336 |
| 60% distilled at, °F | 340 | 341 | 340 | 340 |
| 70% distilled at, °F | 345 | 346 | 344 | 345 |
| 80% distilled at, °F | 353 | 352 | 351 | 351 |
| 90% distilled at, °F | 361 | 363 | 363 | 362 |
| 95% distilled at, °F | 371 | 373 | 376 | 376 |
| Saybolt color | +30 | +30 | +11 | +30 |
| Corrosion, ASTM | 1a | 2a | 1a | 2a |
| Tag flash, °F | 106 | 107 | 111 | 110 |
| Aromatics, ASTM D 1019 | 19.1 | 12.6 | 89.6 | 88.6 |
| Kauri-butanol number | 38.6 | 38.5 | 84.2 | |
| Aniline point, ASTM | [1] 130 | [1] 131 | [2] 21.6 | [2] 22.1 |
| Sulfur, p.p.m | 150 | 4 | 118 | 7 |
| Bromine number | 0.31 | 0.14 | 0.55 | 0.2 |
| Refractive index at 20°C | 1.43787 | 1.43793 | 1.49285 | 1.49211 |
| Analysis: | | | | |
| Benzene | | | 0.5 | 0.5 |
| Toluene | | | 0.8 | 0.7 |
| C₈ Aromatics | | | 9.2 | 8.6 |
| C₉ | | | 39.6 | 38.4 |
| C₁₀ | 14.7 | 15.5 | 22.7 | 23.5 |
| C₁₁ | | | 10.0 | 11.4 |
| Indan | | | 2.9 | 3.0 |
| Naphtholene | | | 0.2 | 0.2 |
| Olefins | 2.8 | 2.6 | 1.5 | 1.8 |
| Paraffins | 43.4 | 43.2 | 6.0 | 5.8 |
| Naphthenes | 39.1 | 38.7 | 6.0 | 6.1 |
| Odor | [3] | [4] | [3] | [4] |

[1] °F.  [2] °C. (mixed).  [3] Unsatisfactory.  [4] Good.

It will be clear from the data in Table II that treating the Varsol distillate in accordance with the present invention resulted in a product of good odor containing only 4 p.p.m. of sulfur. Likewise, the SO₂ extract of the Varsol distillate was of good odor and contained only 7 p.p.m. of sulfur. It is to be noted that the aromaticity of the Varsol distillate treated in accordance with the present invention and of the SO₂ extract are substantially different. Therefore, the distillate and the product may be combined to produce a solvent of adjustable aromaticity as may be desired.

Other runs were performed wherein a Varsol fraction was subjected to sulfur dioxide extraction to form an extract and a raffinate phase. The raffinate phase was then subjected to hydrofining, caustic washing, and percolation through a bed of activated charcoal. The inspection characteristics and the analysis of the product from these runs are shown in Table III.

Table III

| Fraction | Feed | Extract | Raffinate | |
|---|---|---|---|---|
| | | | Before hydrofining | After hydrofining |
| Gravity, °API | 47.8 | 32.8 | 51.0 | 50.7 |
| I.B.P., °F | 305 | 308 | 308 | 313 |
| F.B.P., °F | 390 | 423 | 397 | 396 |
| 5% distilled at, °F | 312 | 315 | 315 | 319 |
| 10% distilled at, °F | 315 | 317 | 317 | 320 |
| 20% distilled at, °F | 318 | 320 | 319 | 323 |
| 30% distilled at, °F | 322 | 323 | 323 | 326 |
| 40% distilled at, °F | 325 | 327 | 326 | 329 |
| 50% distilled at, °F | 330 | 331 | 330 | 333 |
| 60% distilled at, °F | 335 | 336 | 335 | 337 |
| 70% distilled at, °F | 340 | 341 | 342 | 341 |
| 80% distilled at, °F | 349 | 349 | 350 | 349 |
| 90% distilled at, °F | 361 | 363 | 363 | 361 |
| 95% distilled at, °F | 375 | 378 | 375 | 373 |
| Dry point, °F | 384 | 411 | 388 | 389 |
| Tag flash, °F | 97 | 108 | 101 | 105 |
| Saybolt color | +30 | +30 | +30 | +30 |
| Corrosion, ASTM | 1b | 1a | 1a | 1b |
| Aromatics, ASTM D 875 | 20.0 | 84.0 | 9.0 | 8.0 |
| Aniline point, °F. ASTM | 123 | [1] 23.8 | 145 | 146 |
| Refractive index | 1.43927 | 1.48507 | 1.42932 | 1.43006 |
| Bromine number | 0.47 | 0.76 | 0.41 | 0.11 |
| Kauri-butanol number | 40.6 | 81.2 | 34.5 | 34.9 |
| Sulfur, p.p.m | 65 | 318 | 9 | 6 |
| Analysis: | | | | |
| Benzene | 0.1 | 0.4 | 0.1 | 0.1 |
| Toluene | 0.3 | 0.7 | 0.2 | 0.2 |
| C₈ aromatics | 3.0 | 13.8 | 0.7 | 0.4 |
| C₉ aromatics | 6.3 | 33.7 | 1.0 | 1.3 |
| C₁₀ aromatics | 4.6 | 20.5 | 1.5 | 1.6 |
| C₁₁ aromatics | 3.2 | 10.6 | 1.7 | 1.6 |
| Indan | 0.6 | 2.7 | 0.1 | 0.2 |
| Naphthenes | 29.6 | 8.7 | 34.2 | 33.1 |
| Paraffins | 41.5 | 7.9 | 48.2 | 49.3 |
| Condensed naphthenes | 9.7 | 0 | 11.2 | 11.4 |
| Naphthalene | 0.4 | 0.1 | 0.4 | 0.4 |
| Olefins | 0.7 | 0.9 | 0.7 | 0.4 |
| Odor | [2] | [2] | [2] | [3] |

[1] °C. (mixed).  [2] Unsatisfactory.  [3] Good.

It will be noted from Table III that the raffinate treated in accordance with the present invention had a sulfur content of only 6 p.p.m. and was of good odor. Therefore, it will be clear that the raffinate from this operation, the product and the extract from Table II, after treating in accordance with the present invention, may be suitably blended as desired to produce solvents of adjustable aromaticity or either one may be used as a solvent. If a substantially saturated aliphatic solvent is desired, the product shown in Table III may be employed whereas if it is desired to use one of greater aromaticity, either the extract treated in accordance with the present invention or blends of the extract, feed, or raffinate may be made to obtain the aromatic content and solvency which is desired in the solvent.

In order to illustrate the practice of the present invention further, a number of Varsol solvents were produced by the sequence of hydrofining, caustic washing, and percolation through activated charcoal. The Varsols produced in these operations are shown in Table IV.

Table IV

| Product | Varsol No. 2 | Varsol No. 1 | Varsol No. 1 | Varsol No. 1 |
|---|---|---|---|---|
| Gravity, ° API | 44.4 | 50.9 | 50.7 | 48.2 |
| I.B.P., °F | 323 | 323 | 313 | 317 |
| F.B.P., °F | 390 | 392 | 396 | 384 |
| 5% Distilled at, °F | 327 | 328 | 319 | |
| 10% Distilled at, °F | 328 | 330 | 320 | 326 |
| 20% Distilled at, °F | 331 | 332 | 323 | |
| 30% Distilled at, °F | 333 | 334 | 326 | |
| 40% Distilled at, °F | 336 | 336 | 329 | |
| 50% Distilled at, °F | 338 | 339 | 333 | 336 |
| 60% Distilled at, °F | 342 | 342 | 337 | |
| 70% Distilled at, °F | 346 | 347 | 341 | |
| 80% Distilled at, °F | 352 | 353 | 349 | |
| 90% Distilled at, °F | 363 | 363 | 361 | 364 |
| 95% Distilled at, °F | 374 | 374 | 373 | |
| Dry point, °F | 384 | 384 | 389 | 378 |
| Tag flash, °F | 112 | 111 | 105 | 109 |
| Color Saybolt | +30 | +30 | +30 | +30 |
| Aniline point, °F | 104 | 151 | 146 | 133 |
| Kauri-butanol number | 44.2 | 33.5 | 34.9 | 37.6 |
| Sulfur, p.p.m | | 7 | 6 | 4 |
| Bromine number | 0.12 | 0.11 | 0.11 | 0.11 |
| Aromatics, ASTM D 875 | 32.0 | 3.0 | 8.0 | 13.9 |
| Corrosion, Varsol | | | lb | 2 |
| Odor, bulk | Pass | Pass | Pass | Pass |
| Odor, resid | Pass | Pass | Pass | Pass |

Again it will be noted that the several Varsols have a low sulfur content, are substantially saturated as indicated by the aromatics content and have a good odor.

The present invention is quite useful and advantageous in that for the first time a solvent of improved odor characteristics may be produced which is acceptable to the trade. Heretofore, solvents have been produced which had objectionable odors which were found to be unacceptable to the dry-cleaning industry. The products produced in the present invention are not only good solvents but are useful as insecticide bases and will find many uses where an aliphatic saturated solvent is employed or where one of adjustable aromaticity is required. The present invention is therefore quite advantageous and useful.

Another substantial advantage for the present invention is that solvents, such as hexane, may be produced which are acceptable to the food industry in extraction of edible oils to remove deleterious substances therefrom.

Activated charcoal and activated magnesium oxide are used herein in the sense described by Mantell in his work on "Adsorption," McGraw-Hill Book Co., Inc., second edition, New York, 1951.

The nature and objects of the present invention having been fully described and illustrated, what we wish to claim as new and useful and secure by Letters Patent is:

1. A method for producing solvents of improved odor which comprises contacting an aliphatic saturated hydrocarbon fraction boiling in the range from about 100° to about 160° F. and containing odoriferous compounds including sulfur compounds with a fresh aqueous solution of alkali metal hydroxide having a Beaume' gravity within the range from about 15° to about 50°, separating said solution from the fraction, treating the separated fraction with a sweetening reagent selected from the group consisting of solutions of alkali metal hypochlorite, solutions of alkaline earth metal hypochlorite, and cupric chloride, said separated fraction containing trace quantities of said odoriferous compounds including sulfur compounds and then contacting the treated fraction with an adsorbent selected from the group consisting of bauxite, activated magnesium oxide, activated charcoal, and mixtures of activated magnesium oxide and activated charcoal to obtain a solvent of improved odor.

2. A method in accordance with claim 1 in which the adsorbent is activated magnesium oxide.

3. A method in accordance with claim 1 in which the adsorbent is activated charcoal.

4. A method in accordance with claim 1 in which the adsorbent is a mixture of activated charcoal and activated magnesium oxide.

5. A method in accordance with claim 1 in which the adsorbent is bauxite.

6. A method for producing solvents of improved odor which comprises contacting an aliphatic saturated hydrocarbon fraction boiling in the range from about 100° to about 450° F. and containing odoriferous compounds including sulfur compounds with a fresh aqueous solution of alkali metal hydroxide having a Beaume' gravity within the range from about 15° to about 50°, separating said solution from the fraction, said separated fraction containing trace quantities of said odoriferous compounds including sulfur compounds, contacting said separated fraction with a reagent chosen from the group consisting of solutions of alkali metal hypochlorite, solutions of alkaline earth metal hypochlorite, and cupric chloride to remove substantially said sulfur compounds contained in said separated fraction and then flowing the treated fraction through a bed of adsorbent selected from the group consisting of bauxite, activated magnesium oxide, activated charcoal, and mixtures of activated magnesium oxide and activated charcoal at a flow rate within the range from about 1.0 to about 6.0 volumes of separated fraction per volume of adsorbent per hour to obtain a solvent of improved odor.

7. A method for producing hydrocarbons of improved odor which comprises contacting a feed hydrocarbon fraction boiling in the range from about 100° to about 550° F. and containing odoriferous compounds including sulfur compounds with a fresh aqueous solution of alkali metal hydroxide having a Beaume' gravity within the range from about 15° to about 50°, separating said solution from the fraction, said separated fraction containing trace quantities of said odoriferous compounds as well as sulfur compounds, contacting said separated fraction with a reagent chosen from the group consisting of solutions of alkali metal hypochlorite, solutions of alkaline earth metal hypochlorite, and cupric chloride to remove substantially said sulfur compounds contained in said separated fraction and then contacting the treated fraction with an adsorbent selected from the group consisting of bauxite, activated magnesium oxide, activated charcoal, and mixtures of activated magnesium oxide and activated charcoal to obtain hydrocarbons of improved odor.

8. A method in accordance with claim 7 in which the adsorbent is activated charcoal.

9. A method for producing solvents of improved odor which comprises solvent extracting a naphtha fraction boiling in the range from about 100° to about 550° F. containing aromatic and saturated hydrocarbons under conditions to obtain raffinate and extract phases containing odoriferous compounds including sulfur compounds, separately treating said raffinate and extract phases under hydrofining conditions with a sulfur-insensitive catalyst, separately contacting the treated phases with an aqueous solution of alkali metal hydroxide having a Beaume' gravity within the range from about 15° to about 50°, separating said solution from the phases, said separated phases containing trace quantities of said odoriferous compounds as well as sulfur compounds, and then separately contacting the separated phases with an adsorbent selected from the group consisting of bauxite, activated magnesium oxide, activated charcoal, and mixtures of activated magnesium oxide and activated charcoal to obtain solvents of improved odor, and reblending at least a portion of each separated phase to obtain a product of desired aromaticity and satisfactory odor.

10. A method in accordance with claim 9 in which a portion of the naphtha fraction is also separately treated, contacted with alkali metal hydroxide solution and with adsorbent and then blended with the solvents from the raffinate and extract phases.

References Cited in the file of this patent

UNITED STATES PATENTS

| | | |
|---|---|---|
| 2,327,504 | Cohen | Aug. 24, 1943 |
| 2,488,855 | Denton | Nov. 22, 1949 |
| 2,574,449 | Lorne et al. | Nov. 6, 1951 |
| 2,717,230 | Murry et al. | Sept. 6, 1955 |
| 2,944,012 | Thompson | July 5, 1960 |